United States Patent [19]

Konishi et al.

[11] Patent Number: 5,298,927
[45] Date of Patent: Mar. 29, 1994

[54] VISUAL AXIS DETECTOR HAVING A HIGH SENSITIVITY TO A LIGHT FROM AN EYE

[75] Inventors: Kazuki Konishi, Tokyo; Akihiko Nagano, Kawasaki, both of Japan

[73] Assignee: Canon Kabushiki Kaisha, Tokyo, Japan

[21] Appl. No.: 814,493

[22] Filed: Dec. 30, 1991

[30] Foreign Application Priority Data

Jan. 8, 1991 [JP] Japan .................. 3-11494

[51] Int. Cl.⁵ ............................ A61B 3/10
[52] U.S. Cl. .................. 351/211; 351/200; 351/205
[58] Field of Search ............ 351/200, 205, 211, 246, 351/210

[56] References Cited

FOREIGN PATENT DOCUMENTS 1-274736 11/1989 Japan .
2-209125 8/1990 Japan .
2-264632 10/1990 Japan .

Primary Examiner—Scott J. Sugarman
Assistant Examiner—Hung Xuan Dang
Attorney, Agent, or Firm—Fitzpatrick, Cella, Harper & Scinto

[57] ABSTRACT

A visual axis detector includes an illumination device for illuminating an eye; an optical device for guiding light from the eye; the light being in a form of a light intensity distribution having first and second portions; a photo-sensing device, having an array of photo-cells, for receiving the light guided by the optical device, and for generating an electrical signal corresponding to the light intensity distribution; an arithmetic operation device for calculating a visual axis of the eye in accordance with the electrical signal generated by the photo-sensing device; and a control device for controlling the photo-sensing device to have different sensitivities for sensing the first and second portions of the light intensity distribution.

16 Claims, 7 Drawing Sheets

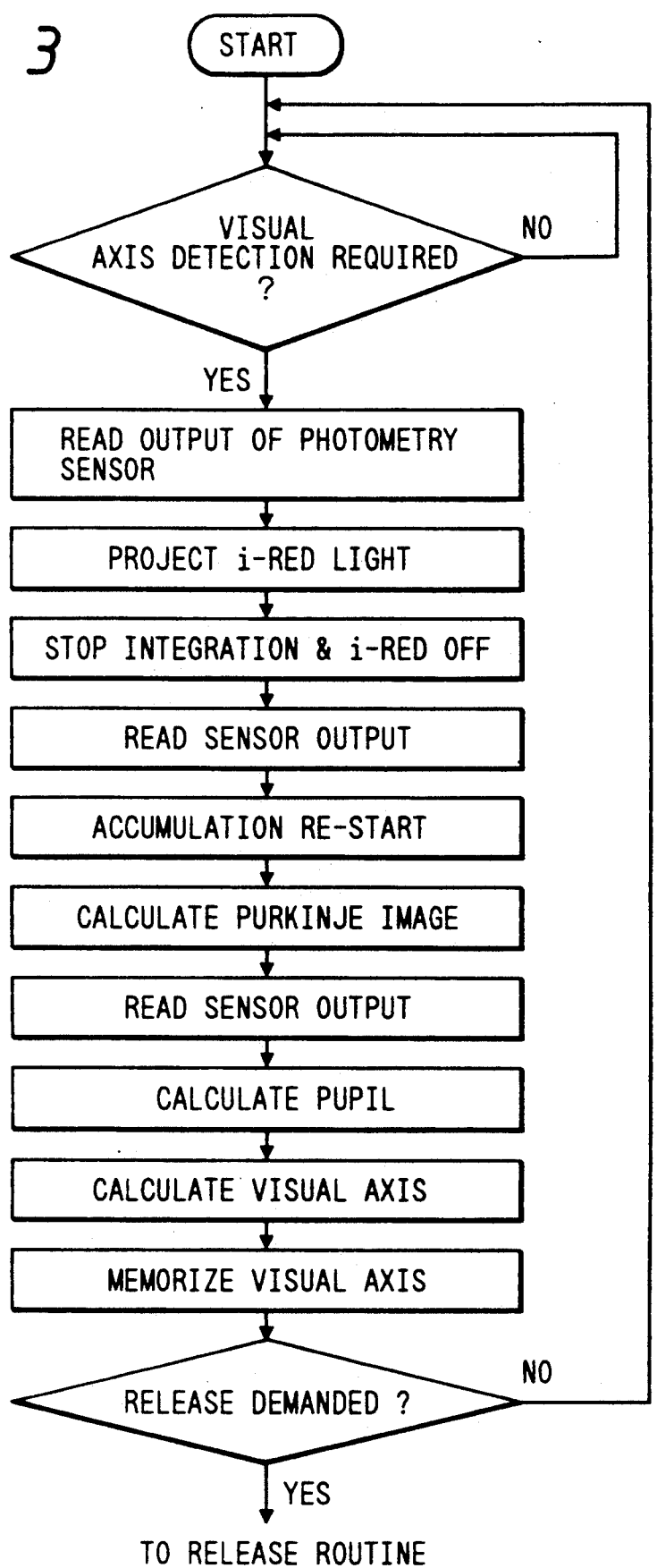

VISUAL AXIS DETECTOR HAVING A HIGH SENSITIVITY TO A LIGHT FROM AN EYE

BACKGROUND OF THE INVENTION

1. Field of the Invention

The present invention relates to an apparatus for detecting a direction of visual axis of an eye of an observer, and more particularly to an apparatus which can effectively obtain data for calculating the visual axis The present apparatus is applicable, for example, to a single lens reflex type camera or a video camera.

2. Description of the Related Art

An apparatus for detecting a visual axis has been developed as a means for studying a physiological function of an eye or checking an effect of an advertisement, and it has recently been proposed to use it as a means for inputting a photographing condition of a camera to a controller. Japanese Laid-Open Patent Application No. 1-274736 discloses a single lens reflex camera having a visual axis detector equipped therein An example of a prior art visual axis detector is shown in FIG. 8 to explain problems in the prior art.

A light beam is irradiated to an eyeball of an observer (photographer) to form a first Purkinje image (cornea reflected image) based on a reflected light from the eyeball and a front eye part image on an image sensor plane in order to detect a visual axis of the eyeball by using positional coordinates of images on the image sensor plane.

Numeral 81 denotes a microprocessing unit (MPU) which carries out various arithmetic operations such as the calculation of the visual axis by using the positional information of the first Purkinje image and the front eye part. Numeral 82 denotes a memory and numeral 83 denotes an interface circuit having an A/D conversion function. Numeral 87 denotes a light projection means which projects an infrared light, which is not visually detectable by to an observer, emitted by an infrared light emitting diode 87a to an eyeball (not shown) of the observer through a projection lens 87b. Numeral 85 denotes a light emission control circuit which controls the light emission of the infrared light emitting diode 87a. Numeral 86 denotes a position sensor which detects a vertical/horizontal position of a camera when the visual axis detector is mounted on the camera.

Numeral 84 denotes detection means having an image sensor 84a, a driver 84b and a lens 84c. It focuses a first Purkinje image based on a reflected light from the eyeball and a front eye part image on a plane of the image sensor 84a through the lens 84c.

A method for detecting a visual axis of an eye has been proposed in Japanese Laid-Open Patent Application No. 2-209125 or Japanese Laid-Open Patent Application No. 2-264632. In the prior art, the visual axis is detected by using information corresponding to two positions, namely the position of first Purkinje image (corneal reflect image of the light source) and the center of the pupil calculated by plural portions surrounding the pupil.

The infrared ray is irradiated to the eyeball of the observer from the light projection means and a position at which a virtual image of the infrared light emitting diode 87a created by the reflection by the front part of the cornea, that is, the first Purkinje image, is formed is detected by the image sensor 84a. The position at which the first Purkinje image is formed corresponds to the position of the pupil center when a rotation angle of the eyeball is zero (the visual axis of the eyeball) and the position deviates from the pupil center as the eyeball rotates.

The deviation (distance) between the first Purkinje image and the pupil center is substantially proportional to sine of the rotation angle of the eyeball. Thus, the distance is determined based on the positional information of the first Purkinje image and the pupil center. The rotation angle of the eyeball and the correction of the visual axis, (that is, compensation for an error of the visual axis relative to the optical axis) are calculated to determine the visual axis of the photographer.

An integration time of the image sensor when it senses the light beam is set by taking into consideration various conditions such as a light emission intensity of the infrared light emitting diode, a sensitivity of the image sensor, an S/N ratio, and a usually anticipated external light in photographing. Thus, the image sensor integrates the light beam for the preset integration time period.

As a result, various problems may arise depending on the illumination intensity of the front eye part of the eyeball. For example, if the illumination intensity is low, a contrast (a difference between output values) between the pupil and an iris is small and it is difficult to detect a contour of the pupil. On the other hand, if the illumination intensity is very high, the image sensor saturates and a difference between the output signals of the first Purkinje image and the iris image, which inherently has a difference, is lost, and it is impossible or difficult to detect the first Purkinje image.

SUMMARY OF THE INVENTION

It is an object of the present invention to detect a visual axis with a high precision without regard to an illumination intensity of a front eye part.

It is another object of the present invention to properly control an integration time of an image sensor when it senses a light beam so that a signal having a sufficient contrast to detect either the first Purkinje image or the front eye part image is produced within a dynamic range of the image sensor in order to permit the high precision visual axis detection.

It is other object of the present invention to correctly set a photographing condition of a camera by an output of a visual axis detector.

BRIEF DESCRIPTION OF THE DRAWINGS

FIG. 3 shows a flow chart of Embodiment 1 of the present invention.

DETAILED DESCRIPTION OF THE PREFERRED EMBODIMENTS

Figure 1:
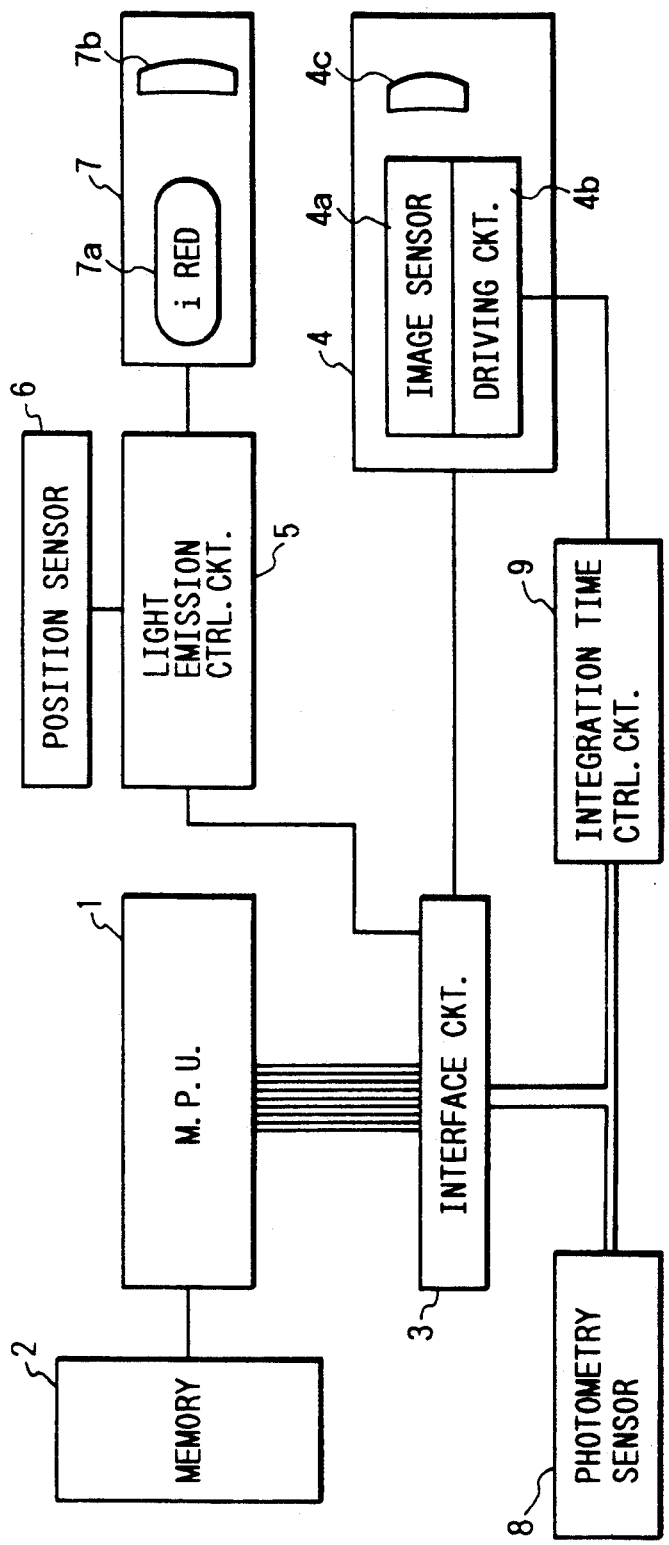
FIG. 1 shows an electrical block diagram of Embodiment 1 of the present invention.

In FIG. 1, numeral 1 denotes a microprocessing unit (MPU) which carries out various arithmetic operations such as calculation of the visual axis by using the positional information of the first Purkinje image and the front eye part image. Numeral 2 denotes a memory and numeral 3 denotes an interface circuit which has an A/D conversion function. Numeral 7 denotes light projection means which projects an infrared ray, which is invisible to an observer, emitted by an infrared light emitting diode 7a to an eyeball of the observer through a projection lens 7b. Numeral 5 denotes a light emission control circuit which controls the light emission of the infrared light emitting diode 7a. Numeral 6 denotes a position sensor which detects a vertical/horizontal position of a camera when the visual axis detector is mounted on the camera.

Numeral 4 denotes detection means which has an image sensor 4a such as a CCD, a driver 4b and a lens 4c. It focuses the first Purkinje image based on the reflected light from the eyeball and the front eye part image on a plane of the image sensor 4a through the lens 4c.

Numeral 8 denotes a photo-sensor which senses an illumination intensity of the front eye part. Numeral 9 denotes an integration time control circuit (integration time control means) which controls an integration time (an accumulation time) of the image sensor 4a based on a signal from the photo-sensor 8 when the image sensor 4a senses the light beams from the first Purkinje image and the front eye part.

A configuration of the present invention when it is applied to a single-lens reflex type camera is now explained with reference to FIGS. 2A and 2B.

Numeral 21 denotes an eye-piece lens in which a dichroic mirror 21a, which transmits a visible light and reflects an infrared ray is obliquely mounted to share a function of a light path divider. Numeral 4a denotes an image sensor, numeral 4c denotes a lens, and numerals 7a1 and 7a2 denote light sources such as light emitting diodes which are components of the light projection means 7.

The image sensor 4a comprises a two-dimensional array of photo-conductive elements and is arranged in a conjugate relation to a vicinity of the pupil of the eye which is at a predetermined position (a normal eye point of a photographer who does not wear eyeglasses) with respect to the lens 4c and the eye lens 21. Numeral 8 denotes a photo-sensor which is arranged in the vicinity of the eye lens 21.

Numeral 29 denotes a processing unit which has functions of calculating the visual axis correction, storing visual axis correction data and calculating the visual axis and includes the MPU 1, the integration time control circuit 9, the light emission control circuit 5, the memory 2 and the interface circuit 3 shown in FIG. 1.

Numeral 201 denotes a fixed or removable photographing lens, numeral 202 denotes a quick return (QR) mirror, numeral 203 denotes a display element, numeral 204 denotes a focusing plate, numeral 205 denotes a condenser lens, numeral 206 denotes a pentagonal prism, numeral 207 denotes a sub-mirror, numeral 208 denotes a multi-point focus detector which detects focuses of a plurality of selected areas in a photographing screen in a known manner, and numeral 209 denotes a camera controller which has the functions of driving the display element in a finder, detecting the focus, and driving the lens.

In the present embodiment, a portion of an object light which is transmitted through the photographing lens 201 is reflected by the QR mirror 202 to focus an object image in the vicinity of the focusing plate 204. The object light diffused by a diffusion plane of the focusing plate 204 is directed to the eye point E through the condenser lens 205, the pentagonal prism 206 and the eye lens 21.

The display element 203 is a two-layer guest-host type liquid crystal element without a polarization plate and it displays a metering range (a focus detection position) in a view field of the finder.

A portion of the object light which is transmitted through the photographing lens 201 passes through the QR mirror 202, is reflected by the sub-mirror 207 and is directed to the multi-point focus detector 208 arranged at the bottom of the camera body. The photographing lens 201 is driven by the photographing lens driver (not shown) in accordance with the focus detection information at a position on the object plane selected by the multi-point focus detector 208 to adjust the focus.

The visual axis detection method may be one of those disclosed in Japanese Laid-Open Patent Application No. 2-209125 or 2-264632, and the explanation thereof is omitted.

Figure 2A:
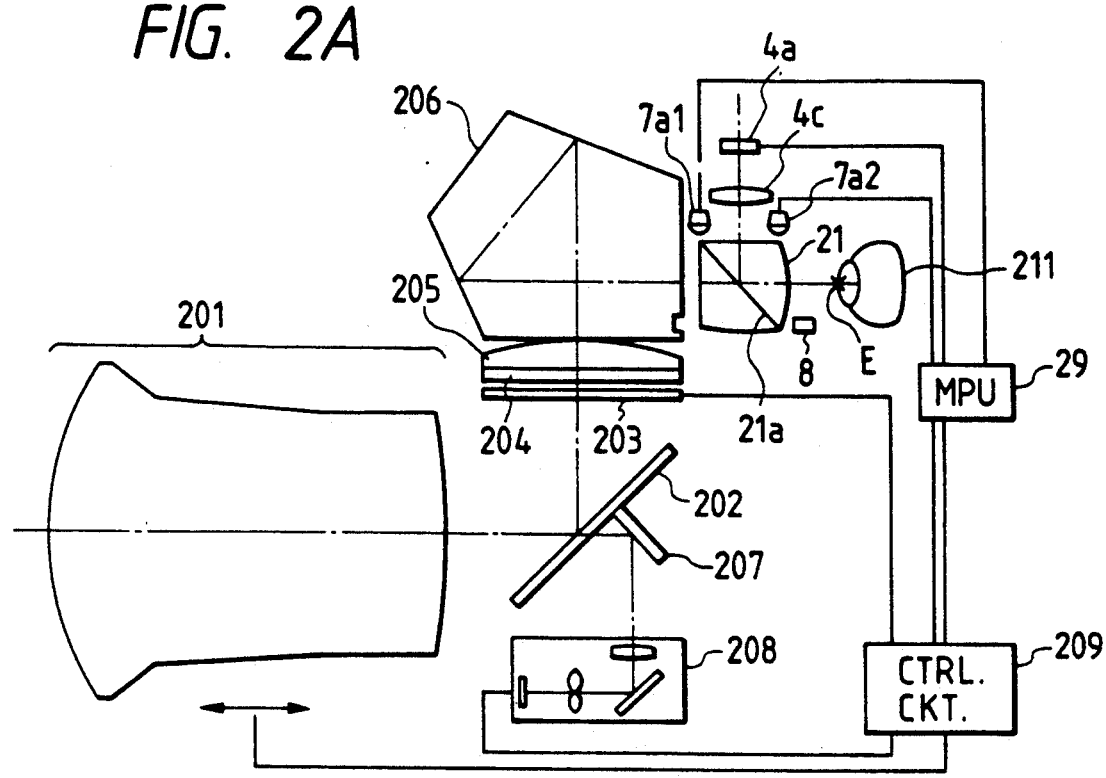
FIG. 2A shows an optical sectional view when the present invention is applied to a single lens reflex type camera.
Figure 2B:
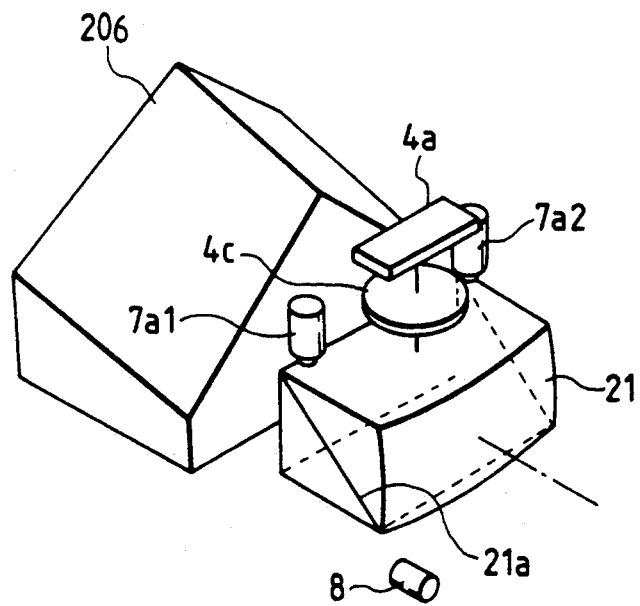
FIG. 2B shows a partial perspective view of FIG. 2A.

In FIG. 2A, the infrared rays emitted from the infrared light emitting diodes 7a1 and 7a2 are directed to the eye-piece 21 from above, are reflected by the dichroic mirror 21a and illuminate the eyeball 211 of the observer located in the vicinity of the eye point E. The infrared ray reflected by the eyeball 211 is reflected by the dichroic mirror 21a, converged by the lens 4c and forms an image on the image sensor 4a.

In the present embodiment, the visual axis of the eyeball is determined by the positions of the first Purkinje image formed on the image sensor 4a and the position of pupil center. The MPU 1 (FIG. 1) reads, through the interface circuit 3, the image of the front eye part at which the first Purkinje image to be read by the image sensor 4a is formed, and determines the coordinates of the first Purkinje image and coordinates of the pupil center obtained by the coordinates of a plurality of areas of the pupil contour. It further determines the rotation angle and the relative shift to the camera of the eyeball of the observer to obtain the visual point on the view field of the finder.

In the present embodiment, the integration time of the image sensor 4i a is appropriately set by the integration time control circuit 9 so that the image sensor 4a produces a signal appropriate for the arithmetic operation.

In the present embodiment, the light intensity in the vicinity of the front eye part is measured by the photo-sensor 8 and the integration time of the image sensor 4a is changed by the signal from the photo-sensor 8. Since the signal intensity of the first Purkinje image and the signal intensity of the iris are significantly different from each other, the first Purkinje image may saturate depending on the integration time with the dynamic range of the presently available image sensor so that the signal waveform may be distorted or the contrast between the pupil and the iris is not sufficiently large to permit the detection of the pupil.

In the present embodiment, the integration time is changed by the integration time control circuit 9 in accordance with the output of the photo-sensor 8, and different integration times are set for the detection of the first Purkinje image and the detection of the pupil so that a sensor output which is appropriate for the arithmetic operation is produced in any case.

FIG. 3 shows a flow chart of an operation of Embodiment 1. When a visual axis detection request is issued such as by depressing a visual axis detection switch (not shown), the control by the MPU 1 goes into a visual axis detection routine. In the visual axis detection routine, the MPU 1 reads the output of the photo-sensor 8 through the interface circuit 3 and calculates an integration time $T_1$ to be used for producing the signal to detect the first Purkinje image, in accordance with the output of the photo-sensor 8.

It is determined based on the intensities of the infrared light emitting diodes 7a1 and 7a2, the F number of the lens 4c and the brightness of the external light. It is set to be sufficiently shorter than an integration time $T_2$ to be explained later.

A light emission command for the infrared light emission diodes (iRED's) 7a1 and 7a2 is issued to the light emission control circuit 5 to cause the iRED's 7a1 and 7a2 to emit lights. When the integration time $T_1$ calculated above has elapsed, the integration is stopped and the iRED's 7a1 and 7a2 are deactivated. The integration time $T_1$ is counted by an internal timer of the MPU 1, which starts the counting at the light emission by the iRED's 7a1 and 7a2 and is reset when the iRED's are deactivated.

In this manner, an image which is appropriate to detect the first Purkinje image is produced on the image sensor 4a. The output signal is read to calculate the position of the first Purkinje image (after a resume command for the integration). When the integration time $T_2$ has elapsed, the MPU 1 reads a signal which is appropriate to detect the pupil image formed on the image sensor 4a through the interface circuit 3 to determine the positions of the pupil contours and the position of the pupil center based on the signal.

Then, the MPU 1 calculates the rotation angle of the eyeball based on the distance between the first Purkinje image and the pupil center, corrects the visual axis and calculates the visual axis position of the photographer. It stores those values in the memory 2 when necessary. The integration time $T_2$ is for producing the signal to detect the pupil image and it is set by hardware as will be explained later.

Figure 4:
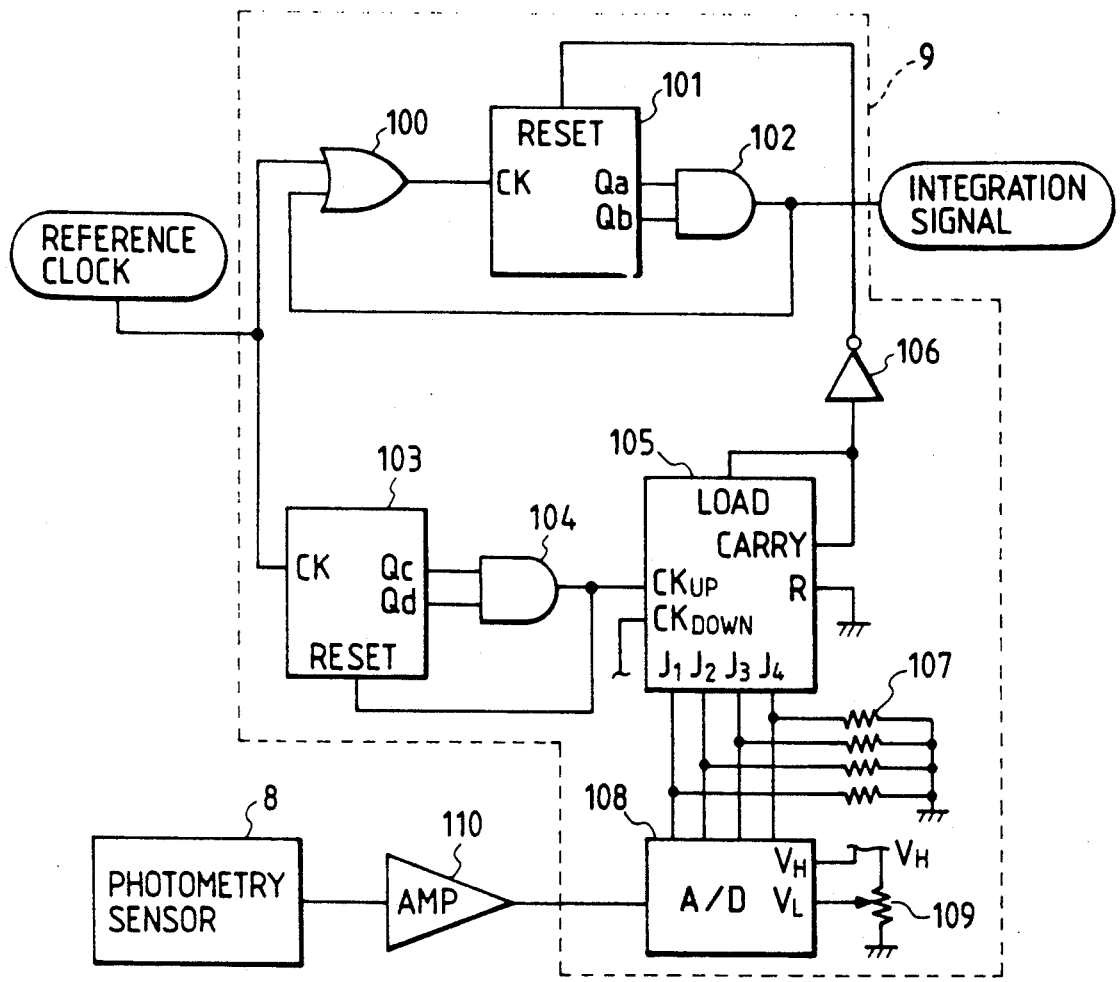
FIG. 4 shows an integration time control circuit of Embodiment 1 of the present invention.
Figure 5:
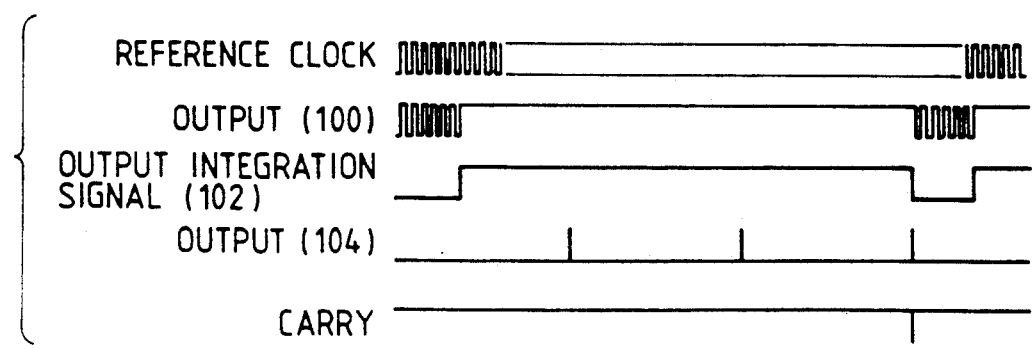
FIG. 5 shows a timing chart of the integration time control circuit of FIG. 4.

FIG. 4 shows a circuit diagram of the integration time control circuit 9 of FIG. 1 and FIG. 5 shows a timing chart of the integration time control circuit 9 of FIG. 5.

Numeral 100 denotes an OR gate, numerals 101 and 103 denote counters, numerals 102 and 104 denote AND gates, numeral 105 denotes a count-of-N counter having a preset function, numeral 106 denotes an inverter, numeral 107 denotes a resistor for stabilizing an input to the counter 105, numeral 108 denotes an A/D converter and numeral 109 denotes a dividing resistor to import a minimum voltage of the A/D conversion.

When a main switch of the camera is turned on and a reference clock is generated, one input to the OR gate 100 is low and the reference clock is applied to the counter 101 from the output of the OR gate 100. When $(2^a + 2^b)$ clock pulses have been applied to the counter 101, the output of the AND gate 102, that is, the integration signal is high and one input to the OR gate 100 is also high. Thus, the output of the OR gate 100 is high and the supply of the reference clock to the counter 101 is stopped. The integration signal is maintained high until a reset voltage is applied to a reset terminal of the counter 101.

The reference clock is also applied to the counter 103. When $(2^c + 2^d)$ clock pulses have been applied to the counter the output of the AND gate 104 is high and the reset voltage is applied to the reset terminal of the counter 103 and the output of the AND gate 104 changes to low.

Since the reference clock is always applied to the counter 103, a pulse of a narrow width is produced at the output terminal of the AND gate 104 each time $(2^c + 2^d)$ clock pulses are applied to the counter 103. The narrow width pulse is applied to the count-of-N counter 105 having the preset function.

When (N-M+1) narrow width pulses are applied to the count-of-N counter 105, the output at the carry terminal changes from high to low, where M is the number preset at the preset terminal ($J_1 - J_4$ in FIG. 4). When the output at the carry terminal is inverted, the reset voltage is applied to the reset terminal of the counter 101 through the inverter 106, so that the output of the AND gate 102, that is, the integration signal changes to low. Since one input to the OR gate 100 also changes to low, the reference clock is again applied to the counter 101. The above operation is then repeated.

As described above, the integration signal is high when $(2^a + 2^b)$ reference clock pulses are applied to counter 101, and low when $(2^c + 2^d) \times (N-M+1)$ reference clock pulses are applied to counter 103. Thus, the integration time T is given by $$T = \{(2^c + 2^d)(N-M+1) - (2^a + 2^b)\}/f_{ck} \qquad (3)$$

where $f_{ck}$ is the frequency of the reference clock.

In the present embodiment, a, b, c, d, N, M and $f_{ck}$ are set as desired to change the integration time.

The change of the integration time in accordance with the output of the photo-sensor 8 (the brightness in the vicinity of the eyeball front eye part) is now explained.

The output of the photo-sensor 8 is applied to the A/D converter 108 through the amplifier 110. The A/D converted output is applied to the preset terminals of the count-of-N counter 105. The larger the output of the photo-sensor 8 is, that is, the brighter the vicinity of the eyeball front eye part is, the larger is the digital output of the A/D converter 108, the larger is the preset value M of the count-of-N counter 105, and the shorter is the integration time given by the formula (3).

On the other hand, the zero level $V_L$ of the A/D conversion and the maximum level $V_H$ are determined by the dividing resistor 109 and the constant voltage $V_H$. When the input voltage to the A/D converter 108 is below the voltage $V_L$ given by the dividing resistor 109, all preset terminals of the count-of-N counter 105 are set to low (that is, M=0).

As seen from the formula (3), the integration time is maximum when M=0. Thus, a, b, c, d, N and $f_{ck}$ in the formula (3) are determined and the maximum integration time is determined, and the zero level voltage $V_L$ is determined to determine the corresponding photo-sensor output. In this manner, the maximum integration time is set when the brightness of the vicinity of the eyeball eye front part is lower than the predetermined level, and the integration time is decreased as the brightness increases.

In the present embodiment, the AND gate 102, 104 have two inputs and the count-of-N counter having the preset function is a hexadecimal (4 bits) counter as shown in FIG. 4 although they are not restrictive. For example, when the AND gate 102 has eleven inputs, the integration time is given by $$T = \left\{ \sum_{i=1}^{l_2} 2^i(N - M + 1) - \sum_{i=1}^{l_1} 2^i \right\}/f_{ck} \quad (3')$$

A photo-sensor for controlling the exposure of the camera may be used as the photo-sensor 8. There may be some difference between outputs due to a difference between the position of the photographer and the position of the object, but this does not raise a problem because such a difference is usually within an allowable error range. The signal of the image sensor 4a may be regarded as the output of the photo-sensor.

The driver 4b of the image sensor 4a drives the image sensor 4a by both the integration control signal which is produced by the integration time control circuit 9 and the integration command which is sent from the MPU 1. Both signals are ANDed and when the output of the AND gate is high, the integration is carried out.

In the second signal read, in reading the signal for detecting the pupil image, only the area around the point at which the Purkinje image was detected may be read to reduce the read time.

Figure 6:
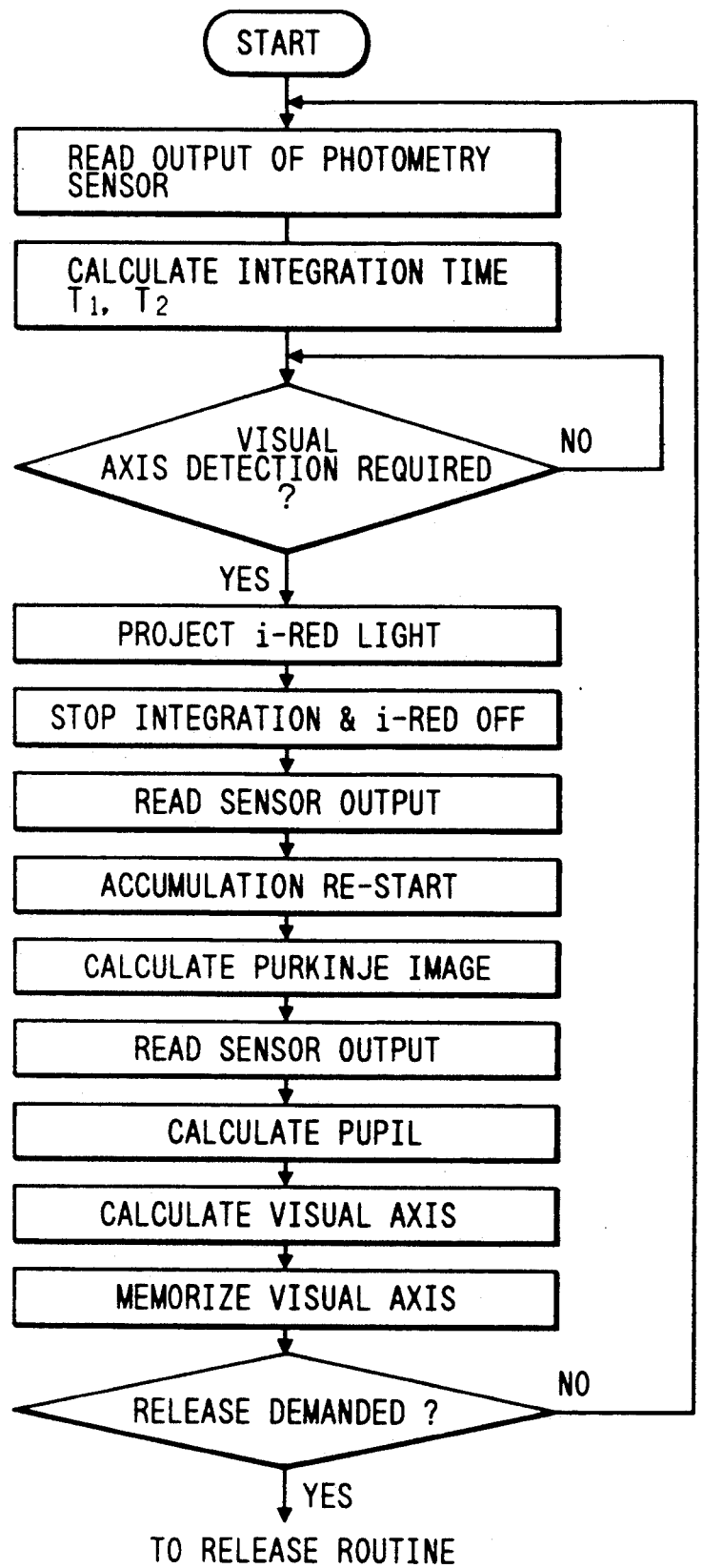
FIG. 6 shows a flow chart of Embodiment 2 of the present invention.
Figure 7:
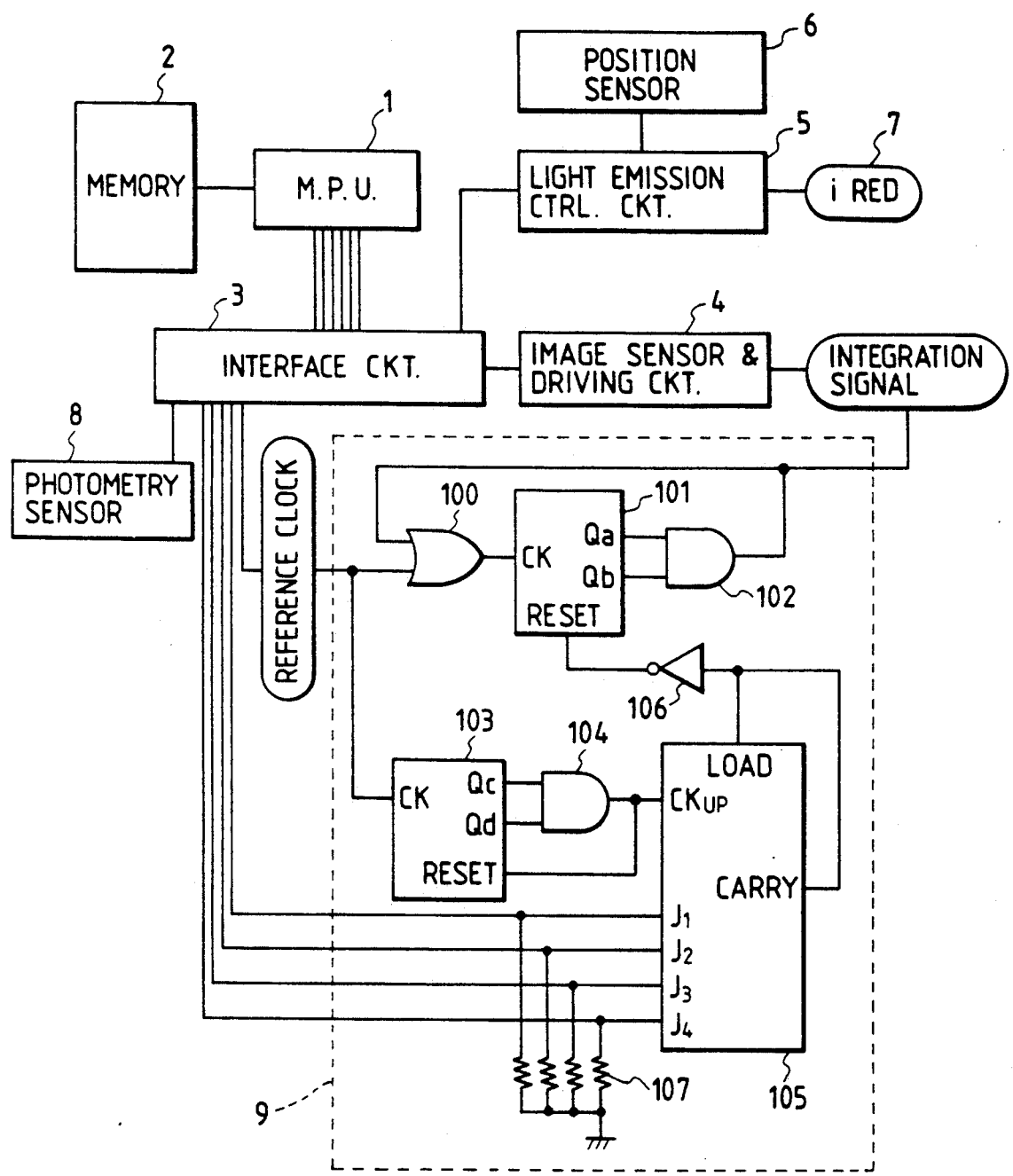
FIG. 7 shows a block diagram of a main portion of the Embodiment 2 of present invention.
Figure 8:
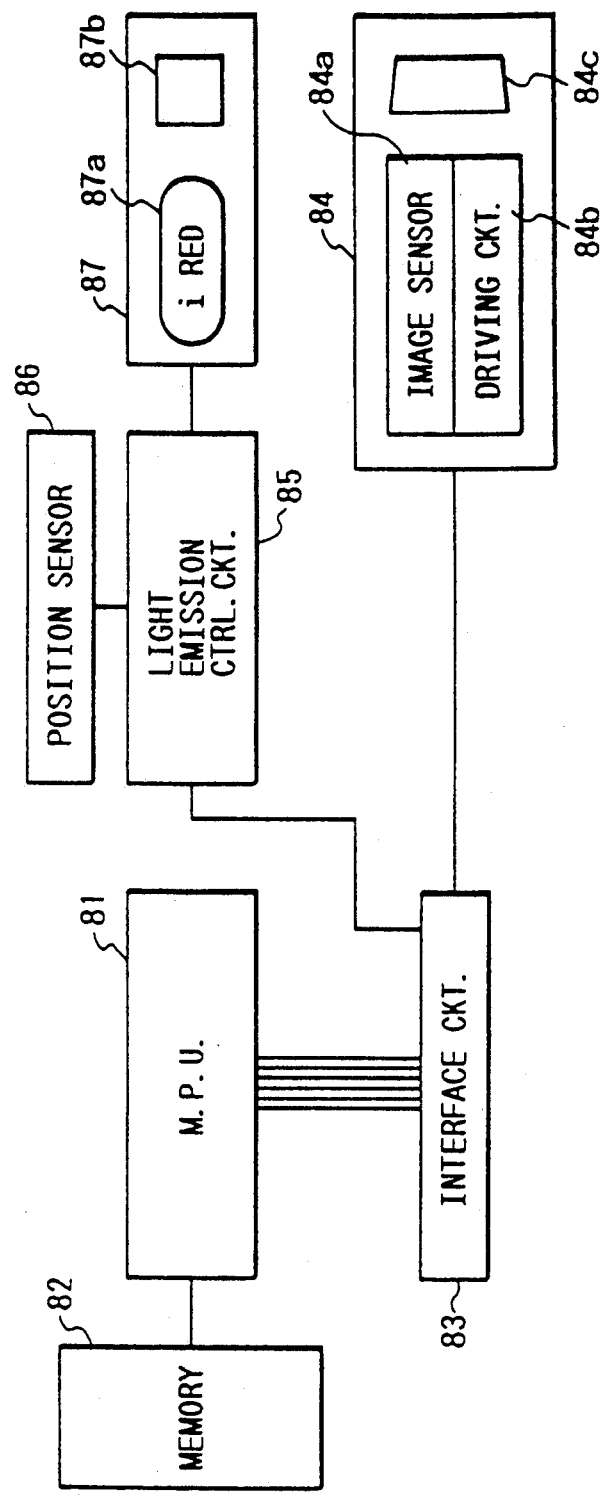
FIG. 8 shows an electrical block diagram of a prior art visual axis detector.

FIG. 6 shows a flow chart of Embodiment 2 of the present invention, and FIG. 7 shows a block diagram of a main portion of the Embodiment 2 of the present invention.

In the present embodiment, the MPU 1 calculates and sets the integration time $T_1$ to detect the first Purkinje image and the integration time $T_2$ for detecting the pupil image based on the output from the photo-sensor 8.

In the present embodiment, the MPU 1 reads the output of the photo-sensor 8 through the interface circuit 3. It first determines the integration time $T_1$ based on the output of the photo-sensor 8. It is set sufficiently shorter than the integration time $T_2$ in accordance with the intensity of the infrared light emitting diode 7a, the F number of the lens 4c and the brightness of the external light, as it is in the Embodiment 1.

Then, the integration time $T_2$ is calculated and set. The value M corresponding to the integration time $T_2$ is set to the count-of-N counter 105 having the preset function shown in FIG. 7, where $M = (V - V_L)/(V_H - V_L)*N$ and $M = 0$ if M is negative, and a maximum value of M is equal to N, and V is a constant determined to set the respective integration times to the output voltages $V_H$ and $V_L$ of the photo-sensor 8. It corresponds to a maximum value and a minimum value of the anticipated output from the photo-sensor 8. When M is set in the count-of-N counter 105, the integration time $T_2$ is given by $$T_2 = \frac{(2^c + 2^d)(N - M + 1) - (2^a + 2^b)}{f_{ck}} \quad (3)$$

M is determined to produce a desired integration time $T_2$. After M has been determined, the MPU 1 sets M to the preset terminals $J_1-J_4$ of the count-of-N counter 105.

If the camera subsequently requests the visual axis detection, the visual axis detection routine is started. In the visual axis detection routine, the MPU 1 first commands the light emission by the iRED 7a and starts to count the integration time $T_1$ by the internal timer of the MPU 1. After the integration time $T_1$ has elapsed, the integration is stopped and the iRED 7a is deactivated. The timer which has been used to count the integration time $T_1$ reset. The output signal from the image sensor 4a is read and then the integration is resumed. The position of the first Purkinje image is calculated based on the output signal of the image sensor 4a. When the integration time $T_2$ has elapsed, the MPU 1 reads the output signal from the image sensor 4a to determine the position of the pupil center. Then, the MPU 1 calculates the rotation angle of the eyeball and the visual axis position of the photographer based on the distance between the first Purkinje image and the pupil center and stores it in the memory 2 when necessary.

In Embodiment 2, the AND gates 102 and 104 may have other than two inputs and the count-of-N counter 105 may be of any type, as they are in the Embodiment 1. The photo-sensor 8 may be shared by the sensor for controlling the exposure of the camera, and the output signal from the image sensor 4a may be used as the output of the photo-sensor.

In accordance with the embodiments of the present invention, the integration time of the image sensor when it senses the light beam is appropriately controlled so that the signal having sufficient contrast for the detection of the first Purkinje image and the detection of the pupil or the iris contour is produced within the dynamic range of the image sensor. Thus, the visual axis detector having the integration time control means which enables the high precision detection of the visual axis is provided.

More particularly, the integration time of the image sensor is set differently for the signal to detect the first Purkinje image and the signal to detect the pupil center in order to produce high quality images of the first Purkinje image and the eyeball front eye part image.

Namely, the first Purkinje image is detected from the image formed by the relatively short integration time and the pupil image is detected by the image formed by the longer integration time so that the first Purkinje image is not saturated and a sufficient contrast is given to the iris contour. In this manner, high precision visual axis detection is attained.

What is claimed is:

1. A visual axis detector comprising:
   illumination means for illuminating an eye;
   optical means for guiding light from the eye, the light being in a form of a light intensity distribution having a first portion and a second portion;
   photo-sensing means, having an array of photo-cells, for receiving the light guided by said optical means, and for generating an electrical signal corresponding to the light intensity distribution;
   arithmetic operation means for calculating a visual axis of the eye in accordance with the electrical signal generated by said photo-sensing means; and
   control means for controlling said photo-sensing means to have different sensitives for sensing the portion and the second portion of the light intensity distribution.

2. A visual axis detector according to claim 1, further comprising measurement means, electrically coupled to said control means, for measuring an effective illumination of the eye.

3. A visual axis detector according to claim 2, wherein said measurement means is independent from said photo-sensing means.

4. A visual axis detector according to claim 2, wherein said photo-sensing means serves as by said measurement means.

5. A visual axis detector according to claim 2, wherein said control means controls said photo-sensing means by changing an integration time of said photo-sensing means in accordance with the effective illumination of the eye measured by said measurement means.

6. A visual axis detector according to claim 1, wherein the first portion comprises a portion of the light intensity distribution formed by a light emitted from said illumination means and reflected by a cornea of the eye.

7. A visual axis detector according to claim 1, wherein the second portion comprises a portion of the light intensity distribution formed by an image of an iris of the eye.

8. A visual axis detector according to claim 1, wherein said control means controls said photo-sensing means by changing an integration time of said photo-sensing means.

9. A visual axis detector comprising:
an illumination source for illuminating an eye;
optical means for guiding light from the eye, the light being in a form of a light intensity distribution;
an image sensor, for receiving the light guided by said optical means, and for converting the light intensity distribution into an electrical signal;
a microcomputer for (i) controlling said illumination source, (ii) controlling an integration time of said image sensor, and (iii) calculating a visual axis of the eye in accordance with the electrical signal which has converted,
said microcomputer controlling the integration time of said image sensor for each of (i) a light emitted from said illumination source and reflected by a corner of the eye, and (ii) a light reflected from a front eye part.

10. A visual axis detector according to claim 9, wherein said microcomputer performs the control functions a plurality of times using different integration times for said image sensor.

11. A visual axis detector according to claim 9, further comprising a photo-detector, electrically coupled to said microcomputer, for measuring an effective illumination of the eye.

12. A visual axis detector according to claim 11, wherein said image sensor serves as said photo-detector.

13. A visual axis detector according to claim 11, wherein said microcomputer controls the integration time of said image sensor in accordance with the effective illumination of the eye measured by said photo-detector.

14. A visual axis detector comprising:
illumination means for illuminating an eye;
optical means for guiding light from the eye, the light being in a form of a light intensity distribution;
photo-sensing means, having an array of photo-cells, for receiving the light guided by said optical means, and for generating an electrical signal corresponding to the light intensity distribution;
arithmetic operation means for calculating a visual axis of the eye in accordance with the electrical signal generated by said photo-sensing means; and
control means for controlling an accumulation time of said photo-sensing means in accordance with an intensity of light reflected by a portion of the eye.

15. A visual axis detector according to claim 14, wherein said control means controls said photo-sensing means to set different accumulation times when sensing light reflected by a corner of the eye, and the reflected light from a front eye part.

16. A visual axis detector according to claim 14, wherein said photo-sensing means performs photometry on the intensity of light reflected by the portion of the eye.

* * * * *

UNITED STATES PATENT AND TRADEMARK OFFICE
CERTIFICATE OF CORRECTION

PATENT NO. : 5,298,927
DATED : March 29, 1994
INVENTOR(S) : KONISHI ET AL.

It is certified that error appears in the above-indentified patent and that said Letters Patent is hereby corrected as shown below:

At [57] ABSTRACT

Line 3, change "eye;" to --eye,--.

Column 1

Line 10, change "axis" to --axis.--.
Line 21, change "therein" to --therein.--
Line 39, delete "to".
Line 58, change "reflect" to --reflected--.

Column 3

Line 39, change "ray" to --ray,--.

Column 4

Line 50, change "4i a" to --4a--.

Column 7

Line 1, change "gate 102," to --gate 102 and--.

Column 8

Line 6, change "$T_1$" to --$T_1$ is--.
Line 62, change "sensitivies" to --sensitivities--
Line 63, change "portion" to --first portion--.
       (first occurrence)

UNITED STATES PATENT AND TRADEMARK OFFICE
CERTIFICATE OF CORRECTION

PATENT NO. : 5,298,927
DATED : March 29, 1994
INVENTOR(S) : KONISHI ET AL.

It is certified that error appears in the above-indentified patent and that said Letters Patent is hereby corrected as shown below:

<u>Column 9</u>

Line 5, delete "by".
    Line 32, change "signal," to --signal; and--.
    Line 37, change "has" to --was--.

<u>Column 10</u>

Line 1, change "corner" to --cornea--.
    Line 35, change "corner" to --cornea--.

Signed and Sealed this

Thirteenth Day of September, 1994

Attest:

BRUCE LEHMAN

Attesting Officer      Commissioner of Patents and Trademarks